United States Patent
Bruns et al.

(10) Patent No.: US 9,826,683 B2
(45) Date of Patent: Nov. 28, 2017

(54) GRAIN MASS FLOW RATE DETERMINATION

(71) Applicants: Deere and Company, Moline, IL (US); Iowa State University Research Foundation, Inc., Ames, IA (US)

(72) Inventors: Aaron J. Bruns, Bettendorf, IA (US); Matthew J. Darr, Ames, IA (US)

(73) Assignees: Deere & Company, Moline, IL (US); Iowa State University Research Foundation, Inc., Ames, IA (US)

( * ) Notice: Subject to any disclaimer, the term of this patent is extended or adjusted under 35 U.S.C. 154(b) by 98 days.

(21) Appl. No.: 14/931,932

(22) Filed: Nov. 4, 2015

(65) Prior Publication Data

US 2017/0118914 A1     May 4, 2017

(51) Int. Cl.
     *A01D 41/00*      (2006.01)
     *A01D 41/127*      (2006.01)
     *A01B 76/00*      (2006.01)
     *A01D 90/10*      (2006.01)

(52) U.S. Cl.
CPC .......... *A01D 41/1272* (2013.01); *A01B 76/00* (2013.01); *A01D 90/10* (2013.01)

(58) Field of Classification Search
CPC ..... A01D 41/1272; A01D 90/10; A01B 76/00
See application file for complete search history.

(56) References Cited

U.S. PATENT DOCUMENTS

| | | | |
|---|---|---|---|
| 5,318,475 A | 6/1994 | Schrock | |
| 6,257,072 B1 * | 7/2001 | Diekhans | A01D 43/085 73/861.26 |
| 6,526,120 B1 | 2/2003 | Gray et al. | |
| 7,340,967 B2 * | 3/2008 | Zweifel | G01G 11/043 177/16 |
| 2014/0076217 A1 | 3/2014 | Liu et al. | |

FOREIGN PATENT DOCUMENTS

JP      2008145117      6/2008

* cited by examiner

*Primary Examiner* — Richard Camby
(74) *Attorney, Agent, or Firm* — Rathe Lindenbaum LLP

(57) ABSTRACT

A harvester includes an auger tube having a first portion and a second portion adjacent the first portion, an auger flight within the first portion of the tube and terminating prior to the second portion to move grain to the second portion, a window along the second portion of the tube and a camera to capture images of grain within the second portion of the tube. A computing device determines grain mass flow based upon the captured images, a dimension of the second portion of the tube and a grain density factor.

23 Claims, 7 Drawing Sheets

GRAIN MASS FLOW RATE DETERMINATION

BACKGROUND

Determining or estimating grain mass flow rate assists in the harvesting of the grain as well as crop management. The determination or estimation of grain mass flow rate using cameras has been prone to inaccuracies.

DETAILED DESCRIPTION OF EXAMPLES

Figure 1:
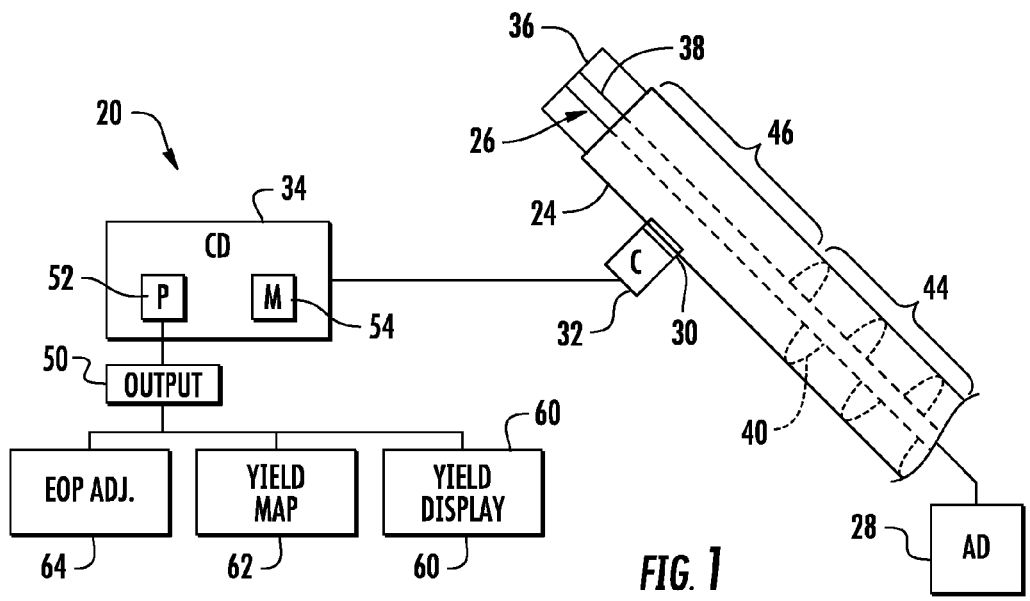
FIG. 1 is a schematic diagram of an example harvester that estimates grain mass flow rate using a camera.

FIG. 1 schematically illustrates an example harvester 20. Harvester 20 determines or estimates grain mass flow using captured images provided by a vision system or camera. As will be described hereafter, harvester 20 estimates grain mass flow in a reliable and accurate fashion by using images of grain movement in a portion of an auger tube omitting auger flights, portions of the auger where there are no blades helically winding about a drive shaft of the auger. Harvester 20 comprises a fountain auger comprising auger tube 24, auger 26, auger drive 28, window 30, camera 32, and computing device 34. Auger tube 24 comprises an elongate tube supported by harvester 20 at an incline. Auger tube extends from a supply of grain that has been harvested to a discharge outlet 36.

Auger 26 extends along auger tube 24 within auger tube 24. Auger 26 comprises an auger shaft 38 and auger flights 40. Auger shaft 34 extends within auger tube 24 and supports auger flights 40. Auger shaft 38 is operably coupled to auger drive 28. Auger flights 40 are supported by auger shaft 34. Auger flights 40 comprise helical vanes helically encircling shaft 38. Auger flights 40 extend within portion 44 of auger tube 24, terminating prior to reaching a second portion 46 of auger tube 24. In the example illustrated, portion 46 of auger tube 24 extends adjacent to portion 44, between portion 44 and discharge outlet 36. Portion 42 of auger tube 24 omits windings, vanes or flights 40 such that grain pushes grain in a more linear fashion along portion 46 of tube 24. The only structure rotating within portion 46 is auger shaft 38. In some implementations, auger shaft 38, rather than extending to discharge outlet 36, may alternatively terminate within portion 46 or at the end of portion 44, prior to reaching portion 46. Portion 46 of auger tube 24 has a length such that the viewing area of camera 32 omits or does not include any auger flights and such that grain is sufficiently compacted across the viewing area of camera 32. In some implementations, as a length of portion 46 increases, the level of accuracy for the grain flow rate estimate also increases. At the same time, as the length of portion 46 increases, the power consumed by auger 26 to move the grain also increases. In one implementation, portion 46 has a length of at least 6 inches for enhanced accuracy without incurring large power consumption. In other implementations, portion 46 may have other lengths.

Auger drive 28 (schematically shown) comprises a powered device that rotatably drives auger 26. In one implementation, auger drive 28 comprises a hydraulically driven motor. In other implementations, auger drive 28 comprises an electric motor or an engine driven shaft. In lieu of being mounted towards a lower end of auger 26, auger drive may alternatively be mounted proximate to discharge outlet 36.

Window 30 comprises a transparent pane or portion provided in the wall of tube 24 adjacent to portion 46 of tube 24. Camera 32 comprises a device that captures images of grain and movement of grain within portion 46. Camera 32 is positioned adjacent to window 30 so as to capture the images of grain movement within portion 46 through window 30. Camera 32 outputs signals, such as digital signals, which are analyzed and processed by computing device 34 for determining grain mass flow.

Computing device 34 comprises a device that receives signals corresponding to the images captured by camera 32 and determines a grain mass flow or grain mass flow estimate using such signals. Computing device 34 further utilizes the determined grain mass flow to provide an output 50. Computing device 34 comprises processing unit 52 and memory 54. Processing unit 52 follows instructions contained in memory 54. In one implementation, processing unit 52 serves as a controller outputting control signals that control the operation of camera 32 and the capture of images by camera 32. Memory 54 comprises a non-transitory computer-readable medium which stores software, code or other instructions for directing the operation of processor 52. In some implementations, memory 54 additionally stores data from camera 32 as well as output 50.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a non-transitory or non-transient computer-readable medium such as random access memory (RAM) for execution by the processing unit from a read only memory (ROM), a mass storage device, or some other persistent storage. In other embodiments, hard wired circuitry may be used in place of or in combination with software instructions to implement the functions described. For example, computing device 34 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 2:
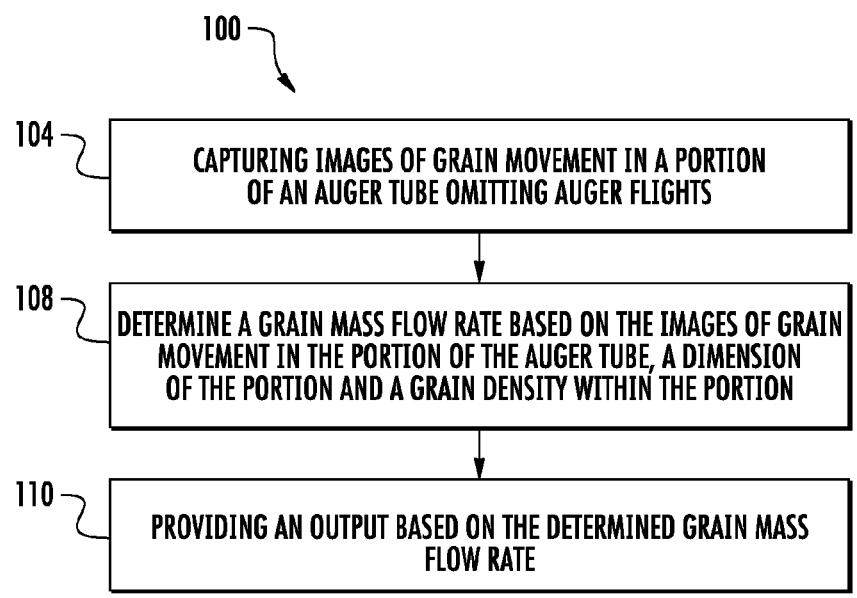
FIG. 2 is a flow diagram of an example method that may be carried out by the harvester of FIG. 1.

In the example illustrated, memory 54 comprise instructions to direct processor 52 to carry out method 100 shown in FIG. 2. As indicated by block 104 and FIG. 2, processor 52 directs camera 32 to capture images of grain movement in portion 46 of auger tube 24 wherein portion 46 omits auger flights 40. Because portion 46 omits auger flights, grain is pushed as a cylindrical column across window 30 more linearly along portion 46 towards discharge outlet 36 by the continued rotation of flights 40. Grain moving through portion 46 is less likely to move in a helical path or arcuate path. As will be described hereafter, in some implementations, additional structures are provided to further facilitate more linear movement or conveyance of grain along portion 46 parallel to a central axis or rotational axis of auger shaft 38.

As the grain moves along portion 46, camera 32 focuses on the moving grain through window 32. Camera 32 captures images of the stream of moving grain and transmits signals to computing device 34. In one implementation, camera 32 captures images at a resolution such that individual pixels are analyzed to identify edges or other structures of the grain. In one implementation, camera 32 captures images at a resolution and rate such that individual pixels corresponding to distinct portions of an individual grain, such as a kernel, are trackable in the multiple images or image frames being output by camera 32.

As indicated by block 108 in FIG. 2, instructions in memory 54 direct processing unit 52 to determine a grain mass flow rate or grain mass flow rate estimate based on or using the images or data from the images of the grain movement in portion 46 captured by camera 32. In the example illustrated, instructions in memory 54 direct processing unit 52 to determine the grain mass flow rate based upon (A) the rate of grain movement in portion 46, (B) a grain density within portion 46, and (C) a dimension of portion 46, such as a cross-sectional area of portion 46. The rate of grain movement and portion 46 is determined through analysis of the captured images received from camera 32. In one implementation, processor 54, through image tracking techniques, tracks the movement of individual pixels, linked to or associated with distinct grain boundaries or boundaries of other materials moving through portion 46, across a viewing area of camera 32 or across the image. Given the time consumed by individual pixel traveling across a predetermined distance, such as a predefined portion or the entirety of distance represented by the images or viewing area of camera 32, processor 32 determines the rate or velocity which the pixel and the associate grain or other material, such as chaff, is moving. The dimension of tube 46, such as a cross-sectional area of tube 24 across portion 46 is stored in memory 54.

In one implementation, computing device 34 obtains the grain density factor value from memory 54. In one implementation, computing device 34 prompts a user to enter a grain density factor of value. In another implementation, computing device 34 prompts a user to enter the type of crop or grain and a moisture value for the grain, wherein computing device 34 calculates a grain density factor of value using the type of crop and the oyster value. In one implementation, harvester 20 comprises sensors that detect the moisture of the grain being harvested, wherein the device 34 utilizes the entered type of grain and the sensed moisture to determine the grain density factor. In another implementation, computing device 34, using image recognition, identifies the type of grain or crop being harvested using the captured images from camera 32, wherein computing device 34 further utilizes either the entered moisture or the sensed moisture along with the identified grain type to determine the grain density factor.

In one implementation, the dimension of portion 46 comprises a cross-sectional area of portion 46 of tube 24 in the viewing range of camera 32. In one implementation, the grain mass flow or grain mass flow estimate is determined by multiplying (A) the cross-sectional area of portion 46 of tube 24, (B) the grain density factor and (C) the rate at which the grain is moving through portion 46 of tube 24. The cross-sectional area of portion 46 of tube 24 comprises the total cross-sectional area of portion 46 which may be occupied by grain and through which the grain may move. This cross-sectional area may comprise the total internal cross-sectional area of portion 46 of tube 24 less the cross-sectional area of any internal structures within portion 46, such as the cross-sectional area of an auger driveshaft that extends through portion 46, but omits vanes. The resulting grain mass flow rate or estimated rate is in terms of a mass or weight of grain moving through portion 46 per a unit of time. As a result, the grain mass flow rate or estimated rate provides an estimate as to how grain mass flow is changing over time as a harvester traverses the field. The higher-yielding portion of a field will have a higher grain mass flow rate as compared to the lower yielding portion of a field.

In one implementation, computing device 34 further estimates the total yield for a given area, such as a total yield for an acre and/or for a field, using the varying grain mass flow rate exhibited while the harvester with traversing the given area or the entire field. For example, the total yield for an acre is determinable by multiplying an average of the grain mass flow rate exhibited during the time at which a harvester traverses an acre by the time during which the harvester was harvesting grain from the acre. Using such calculations, computing device 34 may further determine average grain yield for an entire field or region, such as an average number of bushels per acre or the like. In some implementations, computing device 34 utilizes the grain mass flow rate and/or derivations as one input to a weighted estimation or determination of yield. For example, in some implementations, computing device 34 determines or obtains yield estimates from other sources or methods, wherein each of the different yield estimates are weighted relative to one another according to a predefined weighting and combined to provide a weighted yield estimate.

As indicated by block 110, computing device 34 utilizes the grain yield, in the form of a mass flow rate, to provide an output 50. In one implementation, the output is based upon the determined mass flow rate. In other implementations, the output is based upon a derivation of the mass flow rate, such as an average yield, as described above. FIG. 1 schematically illustrates three examples of output: yield display 60, yield map 62 and equipment operation parameter adjustment 64.

Yield display 60 is a form of output where computing device 34 communicates, visibly and/or audibly, the current mass flow rate and/or the current average yield for a given quantity of a field, such as bushels per acre, to a person. For example, in one implementation, harvester 20 comprises a monitor, wherein the person controlling the operation of harvester 20 is presented with output 60, allowing the person or operator to adjust the operation of harvester 20.

In one implementation, computing device 34 is located on the harvester so as to be carried by the harvester as a harvester traverses a field. In other implementations, computing device 34 is remotely located with respect to harvester 20, wherein signal from camera 32 are communicated in a wireless fashion to the remote computing device 34. In one implementation, the operator of harvester 20, receiving output 60, is riding or carried by harvester 20. In another implementation, the operator of harvester 20, receiving output 60, is also remotely located relative to harvester 20. In implementations where computing device 34 is carried by the harvester 20, output 60 is transmitted wirelessly from computing device 34 to a display or audible output co-located with the operator.

Yield map 62 is a form of output wherein computing device 34 utilizes geo-referenced data for a field to generate a map of a field indicating how the yield or mass flow rate of grain varied from portion to portion across the field. In one implementation, printed by 34 stores the calculated yield map in memory 54. In another implementation, computing device 34 alternatively or additionally transmits and stores a yield map to a remote storage facility, for subsequent display. The yield map identifies those regions of the field having higher yield versus those regions of the field having lower yield, allowing a manager to adjust future management decisions such as the application of herbicide, insecticide, fertilizer, crop type or variety, planting population and the like based upon such information.

Equipment operation parameter adjustment 64 is a form of output wherein computing device 34 utilizes the grain mass flow rate determined in block 108 and/or derivations thereof to automatically control the operation of equipment. In one implementation, computing device 34 utilizes the grain mass flow rate to automatically adjust operation of harvester 20 or another harvesting machine. In one implementation, computing device 34 utilizes the grain mass flow rate to automatically and dynamically adjust, in real time, the operation of harvester 20 itself as harvester 20 is traversing a field, immediately after the capturing of the images by camera 32 from which the grain mass flow rate was determined. For example, in one implementation, in response to determining a jump or increase in the mass flow rate of grain and/or the corresponding grain yield, computing device 34, serving as a controller, automatically outputs control signals increasing the speed at which auger 26 is driven or the speed of other components of harvester 20 accommodating the increase in grain mass flow rate. In one implementation, in response to determining a jump or increasing mass flow rate of grain and/or corresponding grain yield, computing device 34 automatically outputs control signals slowing the rate at which harvester 20 is traversing a field to better ensure that high-yield reasons of the field or more effectively harvested. In one implementation, in response to determining a drop in mass flow rate of grain, and/or corresponding yield, computing device 34 automatically triggers other sensors on harvester 20 to allow the device 34 to determine whether a malfunction exists or whether a harvester setting or parameter is incorrect, resulting in the drop in mass flow rate and/or corresponding yield. In still another implementation, in response to receiving a drop in mass flow rate of grain, computing device 34 automatically outputs control signals increasing the travel speed of harvester 20. In yet other implementations, computing device 34 utilizes the determined grain mass flow rate as a basis for dynamically adjusting other operational parameters of harvester 20 in real time as the harvester 20 is traversing a field.

In yet other implementations, the determined grain mass flow rate is associated with geo-referencing data, such as location data from a global navigation satellite system, and is stored by computing device 34 along with geo-referencing data. During a subsequent harvest, computing device 34 retrieves the stored information and automatically adjusts the operating parameters of harvester 20 based upon the geo-referenced grain mass flow rate and/or corresponding grain yield data from the prior harvest. For example, in response to store data indicating that a particular region of a field exhibited a jump in mass flow during a prior historical harvest, computing device 34 may automatically adjust one or more operating parameters of harvester 20 account for this jump during a subsequent harvest. For example, in one implementation, if stored data indicate that a particular region of field exhibited a jump in grain mass flow, computing device 34 automatically increases the rate at which grain is being conveyed by harvester 20 when harvester 20 reaches the particular region of the field during a subsequent harvest and/or automatically slows the travel speed of harvester 20 when harvester 20 reaches the particular region of the field during the subsequent harvest.

In still other implementations, computing device 34 utilizes the stored historical grain mass flow data and/or the corresponding grain yield data, determined based on the grain mass flow rate data, to adjust operational parameters of other equipment working a field at times other than harvest. For example, in one implementation, the varying grain mass flow rate and/or corresponding yield associated with different regions of the field is used by computing device 34, or another computing device associate with an alternative piece of machinery or equipment, to automatically adjust the operational parameters of planting equipment, cultivating equipment and/or fertilizer, insecticide, herbicide application equipment. In each of such of the above described scenarios, instead of automatically adjusting the operational parameters of equipment, computing device 34 alternatively outputs or displays a recommended adjustment of an operational parameter of equipment based upon the grain yield information determined from the mass flow rate data, wherein it is up to the operator to make or authorize the recommended adjustment.

Figure 3:
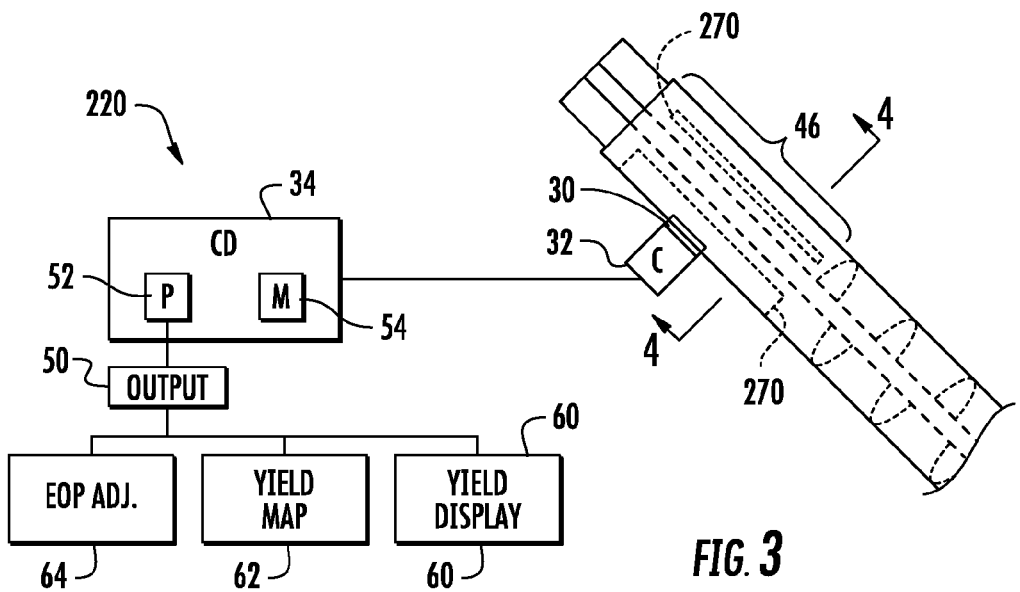
FIG. 3 is a schematic diagram of another example harvester that estimates grain mass flow rate using a camera.

FIG. 3 schematically illustrates harvester 220, another implementation of harvester 20. Harvester 220 is similar to harvester 20 in all respects except that harvester 220 additionally comprises baffles 270. Those remaining elements or components of harvester 220 which correspond to elements or components of harvester 20 are numbered similarly.

Baffles 270 comprise elongated plates, walls or other structures extending within tube along portion 46. Baffles 270 radially project from the interior walls of tube 24 and extends substantially parallel to the rotational axis of auger shaft 38. Baffles 270 assist in facilitating more linear movement of grain within and along portion 46. Baffles 270 inhibit helical or circular movement of grain about the axis of auger shaft 38. As a result, baffles 270 enhance the accuracy of grain mass flow determinations by computing device 34.

In the example illustrated, baffles 270 have a length, measured in a direction parallel to the rotational axis of auger shaft 38, that completely extends across window 30, from one side of window 30 to at least equal to or beyond the other side of window 30. In one implementation, baffles 270 have a length, as measured in a direction parallel to the rotational axis of auger shaft 38, of at least 6 inches and nominally 9 inches. In one implementation, baffles 270 have a radial height of at least 1 inch and nominally 2 inches. In other implementations, baffles 270 may have other dimensions depending upon the type of grain being conveyed, the rate at which auger 26 is expected to be driven and the like. In the example illustrated, harvester 220 is illustrated as including four radially spaced baffles 270, equally distributed on opposite sides of window 30. In other implementations, harvester 220 may include a greater or fewer of such baffles 270 having other locations relative to window 30 and camera 32.

Figure 5:
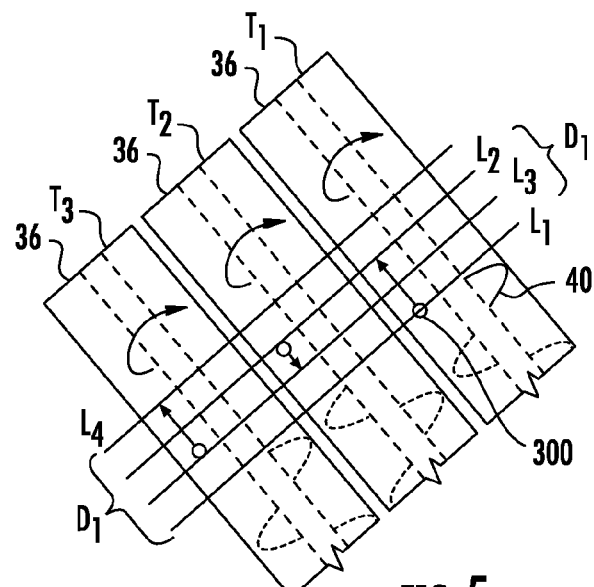
FIG. 5 is a schematic diagram illustrating grain relaxation or retraction caused by rotation of an auger.

In some implementations, movement of grain within portion 46 or within the viewing area of camera 32 pulses due to pulsing by auger flights 40. In other words, the helical nature of auger flights 40 causes grain to move in a pulsating manner, wherein the mass of grain temporarily relaxes and falls back within portion 46 prior to being once again pushed further along tube 24. FIG. 5 schematically illustrates such grain relaxation brought about by pulsing of auger 26. FIG. 5 illustrates movement of grain, represented by individual grain pixel 300 which corresponds to a particular contour or edge of grain or other material. Pixel 300, and its movement, are tracked by computing device 34 using the images provided by camera 32.

As shown by FIG. 5, at time T1, rotation of auger 26 and flights 40 pushes the grain pixel 300 from location L1 to location L2, through a distance D1, in a direction parallel to auger shaft 38. At time T2, continued rotation of auger 26 and flights 40 exhibits a pulsing wherein grain pixel 300 relaxes or retracts, moving from location L2 to location L3 away from discharge outlet 36. At time T3, further rotation of auger 26 and flights 40 once again moves grain pixel 300 through the distance D1, moving from location L3 to location L4. This cycle is repeated to move grain along and through portion 46 of tube 24.

Figure 6:
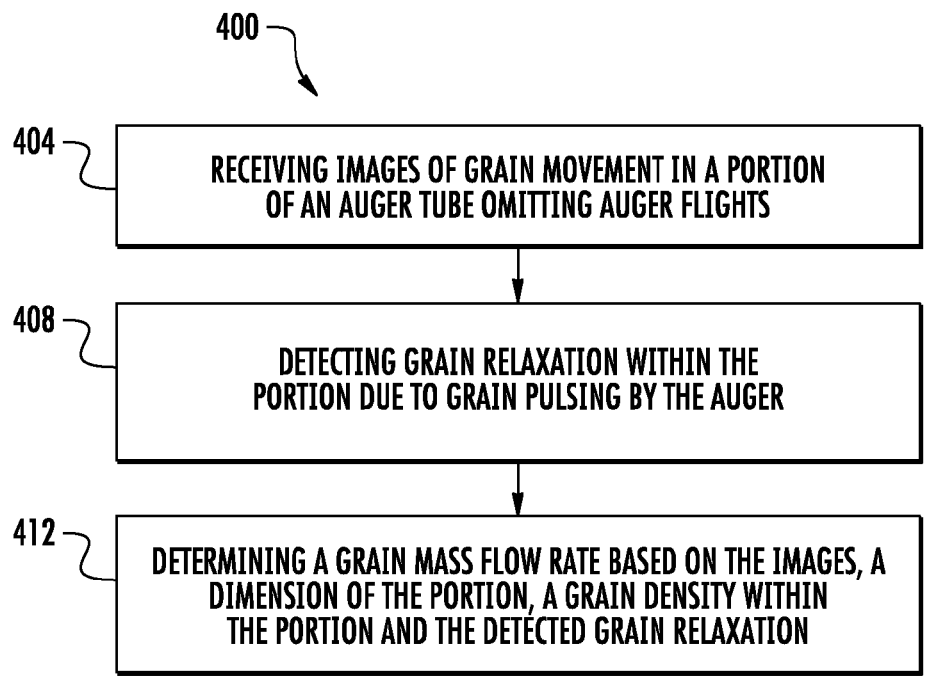
FIG. 6 is a flow diagram of an example method that may be carried out by harvester 20 or harvester 220 to accommodate such grain relaxation.

The refraction or relaxation of the grain within portion 46 brought about by the pulsing or cyclical nature of movement caused by auger 26 causes the grain to repeatedly move forward along the auger 26 by first distance and subsequently back or backwards along the auger 26 by a second distance less than the first distance. As a result, the portions of the grain represented by pixel 300 of the captured images traverse the volume between L2 and L3 twice. Computing device 220, following instructions contained in memory 54, accounts for this redundant travel of grain pixel 300 by carrying out method 400 of FIG. 6 to enhance grain mass flow rate estimation accuracy. As indicated by block 404, computing device 34 receives images of grain movement in portion 46 are tube 24 which omits auger flights 40. As indicated by block 408, computing device 34 detects instances of grain relaxation within portion 46 of tube 24 due to grain pulsing by auger 26. In one implementation, computing device 34 tracks movement of individual grain pixels, such as grain pixel 300, amongst other grain pixels, shown in FIG. 5. Computing device 34 identifies relaxation or movement during which the grain pixel 300 retreats away from discharge outlet 36.

As indicated by block 412, computing device 34 determines the grain mass flow or grain mass flow estimate, in the form of a grain mass flow rate, based on the captured images received from camera 32, a dimension of portion 46 of tube 24, such as the cross-sectional area, a grain density within portion 46 and the detected grain relaxation. When determining the rate at which the grain is moving through portion 26, computing device 34 discounts the retraction a grain pixel 300 during its relaxation, such as during time T2. For example, in one implementation, by tracking individual grain elements or grain pixel 300, computing device 34 automatically takes into account the retractions a relaxations of such grain pixels. In one implementation, computing device 34 compares the starting location and an ending location of a grain pixel during a period of time, thereby taking into account the number of detected relaxations or retreats of grain and the distance of each retreat during the range of time. In another implementation, computing device 34 determines the velocity of the movement of the grain pixel and then subtracts the identified retraction from the determined velocity.

It has been determined that the retraction or relaxation of grain due to the pulsation of auger 26 is greatest in those regions of portion 46 closest to flights 40. The detrimental impact of such grain retractions due to auger 26 may be reduced by enlarging portion 46 such that camera 32 and window 30 any space farther from flights 40 of portion 44. However, enlarging portion 46 may result in greater power consumption for the moving a grain through 224. Because system 220 identifies such grain retractions or relaxations and use the detected grain relaxations as part of its determination grain mass flow, system 220 facilitates a smaller portion 46 and the closer positioning of camera 32 and window 32 portion 44 and its auger flights 40, reducing power consumption to drive the grain along tube 24.

Figure 7:
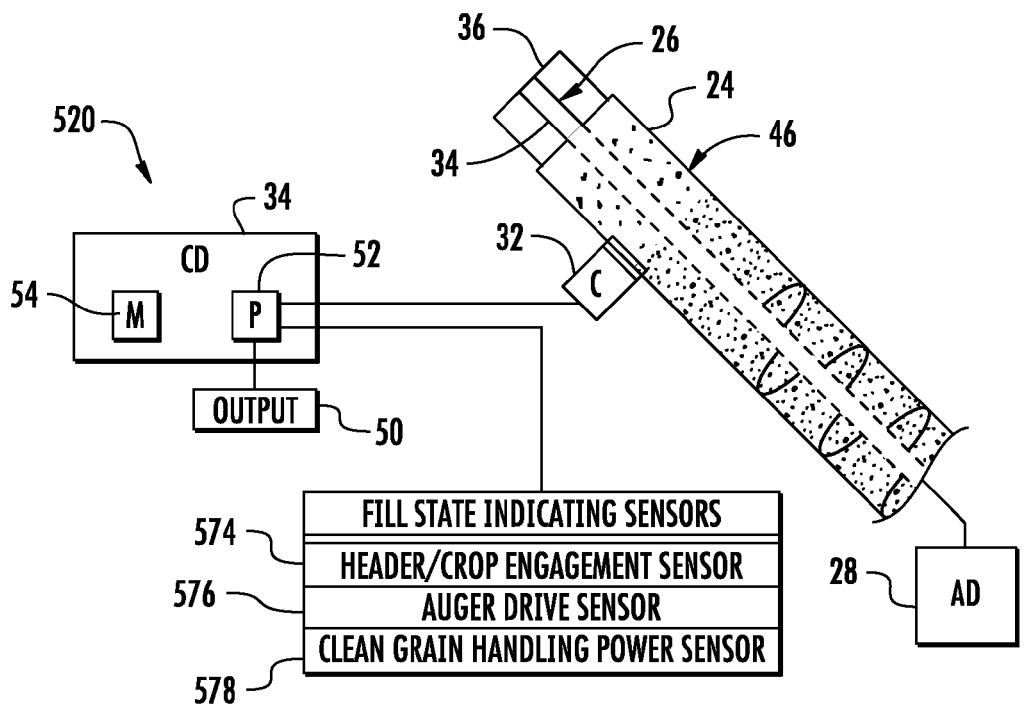
FIG. 7 is a schematic diagram of another example harvester that estimates grain mass flow rate using a camera.

FIG. 7 illustrates harvester 520, another implementation of harvester 20. Harvester 520 is similar to harvester 20 except that harvester 520 estimates grain mass flow or a grain mass flow rate additionally based upon a detected fill state of portion 46. In one implementation, the grain mass flow estimate is further based upon grain relaxations or attractions as described above with respect to FIGS. 5 and 6. As shown by FIG. 7, at times during filling or emptying, portion 46 of tube 24 is not completely filled with grain. During emptying or filling of tube 24, grain will have a lower density in regions of portion 46 where the grain will be less compacted within portion 46, allowing grain to move them around at much higher speeds. If read, aberrational values during filling or emptying of portion 46 may detrimentally impact accuracy of the yield estimate.

Figure 8:
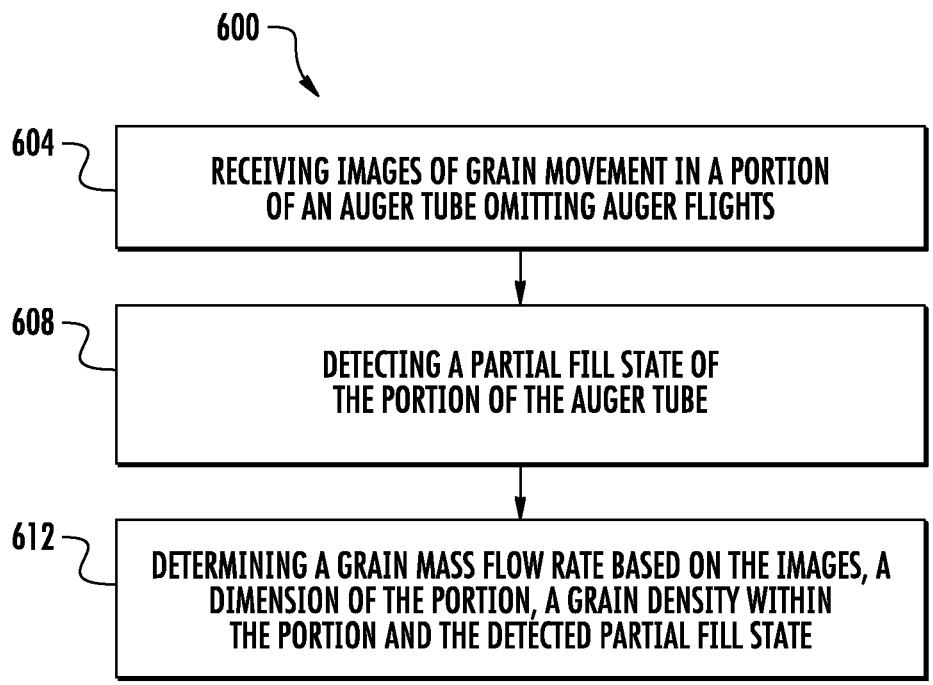
FIG. 8 is a flow diagram of an example method that may be carried out by the harvester of FIG. 1, the harvester of FIG. 3 and/or the harvester of FIG. 7 to determine grain mass flow rate at least partially based upon a detected fill state of an auger tube.

Processor 52 of computing device 34, following instructions contained in memory 54, carries out method 600, shown in FIG. 8, to account for such partial fill state of tube 24. As indicated by block 604, computing device 34 receives images of grain movement in portion 46 of tube 24 which omits auger flights 40.

As indicated by block 608, computing device 34 detects instances of a partial fill state within portion 46 of tube 24. In one implementation, computing device 34 detects a partial fill state based upon the images received from camera 32. In one implementation, tracks one or more grain pixels, corresponding to contours, edges or other detectable features of grain within portion 46. In response to the determined velocity or rate of movement of such track grain pixels exceeding a predefined threshold, computing device 34 determines that a partial fill state is taking place. In some implementations, computing device 34 additionally bases the detection identification of a partial fill state in portion 46 of tube 24 based upon other fill state indicating sensors.

FIG. 7 schematically illustrates various example real state indicating sensors in communication with processor 52 of computing device 34. Such fill state indicating sensors are remote from camera 32. In the example illustrated, such fill state indicating sensors include, but are not limited to, a crop engagements sensor 574, an auger drive sensor 576 and a clean grain handling power sensor 578. Crop engagement sensor 574 comprises a sensor, supported by the header of harvester 520 and output signals indicating engagement of the header with the crop being harvested. In one implementation, sensors may be provided below stripper plates of a header, wherein impact of the grain or crop with such stripper plates is sensed. In other implementations, crop engagement sensor 570 more may comprise other types of sensors. Computing device 34 utilizes such signals to confirm the initial conclusion that tube 26 is in a partial fill state based upon the images received from camera 32.

Auger drive sensor 576 comprises a sensor that senses power consumption for driving auger 26. For example, in implementations where auger drive 28 comprises a hydraulic motor, the pressure of the hydraulic fluid being supplied to drive the hydraulic motor will be lower when portion 46 of tube 24 is in a partial fill state. In one implementation, computing device 34 utilizes such signals from the auger drive sensor 576 to confirm the initial conclusion that tube 24 is in a partial fill state based upon the images received from camera 32.

Clean grain handling power sensor 578 comprises one or more sensors that detect the power consumed by other conveyance systems of harvester 520 that convey clean grain to auger 26. When crop is not presently being harvested, the power consumed by such clean grain handling systems is reduced. At such times, portion 46 of tube 24 may be in a partial fill state. Computing device 34 utilizes such signals from the clean grain handling power sensor 578 to confirm the initial conclusion that tube 24 is in a partial fill state as initially determined based upon images received from camera 32. In other implementations, device 34 may utilize signals from sensors 574, 576 and 578 for determining when portion 46 of tube 24 is in a partial fill state independent of images from camera 32.

As indicated by block 612, computing device 34 determines the grain mass flow rate, based on the captured images received from camera 32, a dimension of portion 46 of tube 24, such as the cross-sectional area, a grain density within portion 46 and the detected fill state of portion 46 of tube 24. In one implementation, computing device 34 excludes any detected grain movement and corresponding grain mass for those periods of time that portion 46 is determined to be in a partial fill state when determining the grain mass flow estimate. In another implementation, computing device 34 subtracts a portion of the yield estimate for the mass flow rate in response to determining that portion 46 is in a partial fill state for a portion of the monitoring time period. In one implementation, the amount that is subtracted may vary depending upon the determined percent fill of portion 46, wherein the greater that portion 46 is completely filled with grain, the smaller the deduction. In one implementation, the device 34 additionally determines a grain mass flow based upon detected grain relaxation or retraction as described above with respect to FIGS. 5 and 6.

Figure 9:
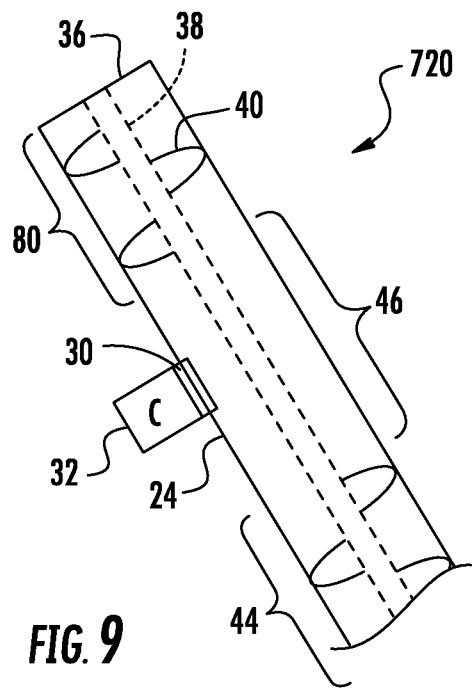
FIG. 9 is a sectional view of a portion of another example harvester that estimates grain mass flow rate using a camera.

FIG. 9 illustrates harvester 720, another implementation of harvester 20. Harvester 720 is similar to harvester 520 except that tube 24 of harvester 720 additionally comprises portion 80. Portion 80 extends adjacent to portion 46 downstream or vertically above portion 46, on opposite sides of portion 46 as portion 44. Portion 80 extends between portion 46 and discharge outlet 36. Portion 80 is similar to portion 44 and that portion 80 comprises auger flights 40 extending about and from auger shaft 38. Auger flights 30 extend within portion 80 and terminate prior to reaching portion 46. After grain has been pushed through portion 46 and images of the moving grain have been captured by camera 32 through window 30, auger flights 40 resume with a conveyance of grain to discharge outlet 36. In some implementations, portion 46 of harvester 720 additionally comprises baffles 270 shown and described with respect to FIGS. 3 and 4.

Figure 4:
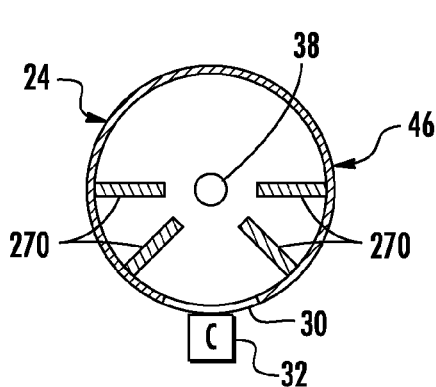
FIG. 4 is a sectional view of the harvester of FIG. 3 take along line 4-4.
Figure 10:
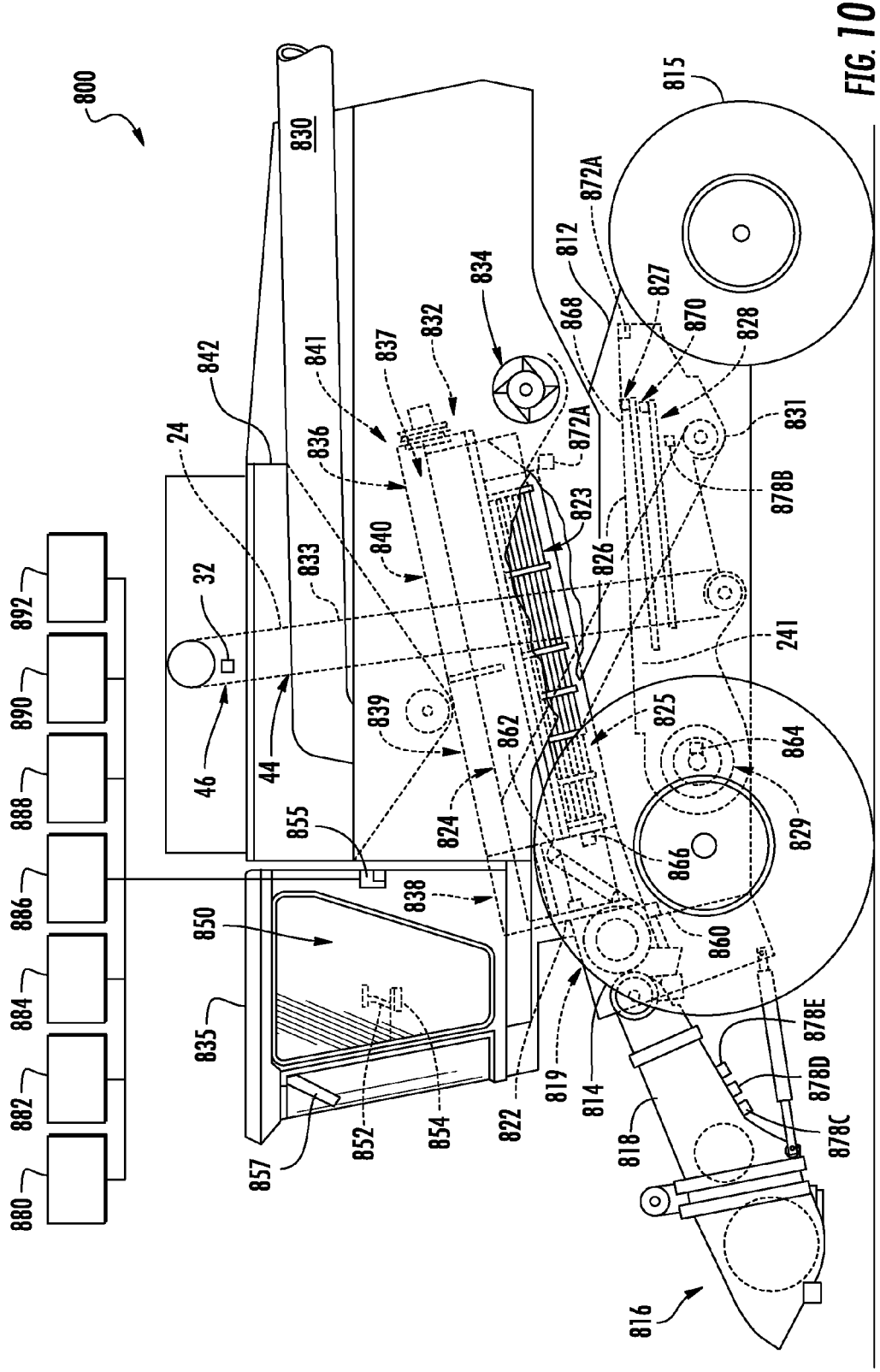
FIG. 10 is a diagram of an example combine harvester that estimates grain mass flow rate using a camera.

FIG. 4 is a diagram of an example harvester, in the form of a combine 800, including the above-described grain mass flow estimation features. As shown by FIG. 10, combine 800 comprises a main frame 212 having wheel structure including front and rear ground engaging wheels 814 and 815 supporting the main frame for forward movement over a field of crop to be harvested. The front wheels 814 are driven by an electronically controlled hydrostatic transmission.

A vertically adjustable header or harvesting platform 816 is used for harvesting a crop and directing it to a feeder house 818. The feeder house 818 is pivotally connected to the frame 812 and includes a conveyor for conveying the harvested crop to a beater 819. The beater 819 directs the crop upwardly through an inlet transition section 822 to a rotary threshing and separating assembly 824. In other implementations, other orientations and types of threshing structures and other types of headers 816, such as transverse frame supporting individual row units, are utilized.

The rotary threshing and separating assembly 824 threshes and separates the harvested crop material. Grain and chaff fall through a concave 825 and separation grates 823 on the bottom of the assembly 824 to a cleaning system 826, and are cleaned by a chaffer 827 and a sieve 828 and air fan 829. The cleaning system 226 removes the chaff and directs the clean grain elevator 833, which includes 224 and auger 26 described above. Clean grain elevator 833 conveys the grain tank 842. The clean grain in the tank 842 can be unloaded into a grain cart or truck by unloading auger 830. Tailings fall into the return elevator or auger 831 and are conveyed to the rotor 837 where they are threshed a second time.

Threshed and separated straw is discharged from the rotary threshing and separating assembly 824 through an outlet 832 to a discharge beater 834. The discharge beater 834, in turn, propels the straw out the rear of the combine. It should be noted that the discharge beater 834 could also discharge crop material other than grain directly to a straw chopper. The operation of the combine is controlled from an operator's cab 835.

In the example illustrated, the rotary threshing and separating assembly 824 comprises a cylindrical rotor housing 836 and a rotor 837 located inside the housing 836. The front part of the rotor and the rotor housing define the infeed section 838. Downstream from the infeed section 838 are the threshing section 839, the separating section 840 and the discharge section 841. The rotor 837 in the infeed section 838 is provided with a conical rotor drum having helical infeed elements for engaging harvested crop material received from the beater 819 and inlet transition section 822.

In the threshing section 839, the rotor 837 comprises a cylindrical rotor drum having a number of threshing elements for threshing the harvested crop material received from the infeed section 838. Downstream from the threshing section 839 is the separating section 840 wherein the grain trapped in the threshed crop material is released and falls to the cleaning system 828.

An operator's console 850 located in the cab 835 includes conventional operator controls including a hydro shift lever 852 for manually controlling the speed range and output speed of the hydrostatic transmission. An operator interface device 854 in the cab 835 allows entry of information into a controller 855 comprising an on-board processor system, which provides automatic speed control and numerous other control functions described below for the combine 800. The operator can enter various types of information into the operator interface device 854, including crop type, location, yield and the like. In the example illustrated, combine harvester 800 additionally comprises display 857 for presenting information to the operator. In some implementations, display 857 may additionally serve as an input device, such as when display 857 comprises a touch screen. In other implementations, display 857 may be combined with interface device 854, such as part of counsel 850. In the example illustrated, controller 855 serves as a computing device 34 described above, operating in one or more user selectable modes, wherein one or more of methods 100, 400 and 600 described above are carried out.

Controller 855 sees multiple signals from sensors throughout harvester combine 800. Signals from the sensors include information on environmental variables such as relative humidity, and information on variables controlled by the on-board control system. Signals include vehicle speed signals from a radar sensor or other conventional ground speed transducer 860, rotor and fan speed signals from transducers 862 and 864, and concave clearance and chaffer and sieve opening signals from transducers 866, 868 and 870, respectively. Additional signals originate from a grain loss sensor 872a at the exit of the rotary threshing and separating assembly 824 and left- and right-hand grain loss sensors 872b at the exit of the cleaning system 226, and various other sensor devices on the harvester. Signals from a camera 32 (described above), a grain moisture sensor 878A, a tailings volume sensor 878B, and relative humidity, temperature and material moisture sensors 878C, 878D and 878E are also provided.

A bus directs signals from the mentioned sensors and an engine speed monitor, a grain mass flow monitor, and other microcontrollers on the harvester to the controller 855. Signals from the operator interface 854 are also directed to the controller 855. The controller 855 is connected to actuators for controlling adjustable elements on the harvester. Feedback signals from the actuators are input to the controller 855.

The actuators controlled by the controller 855 comprise an actuator 880 controlling the rotational speed of the rotary threshing and separating assembly 824, an actuator 882 controlling the clearance of the concave 825, an actuator 884 controlling the opening of a pre-cleaner of the chaffer 827, an actuator 886 controlling the opening width of the chaffer 827, an actuator 888 controlling the opening of the sieve 828, an actuator 890 controlling the speed of the air fan 829, and an actuator 892 controlling the output speed of the hydrostatic transmission and thus the ground speed of the combine. These actuators are known in the art and thus only schematically indicated in FIG. 10. As described above with respect outputs 64, in some implementations, controller 855 may adjust the operational parameters of harvester combine 800 based upon the determined grain mass flow by outputting control signals to one or more of actuators 880-892.

Figure 11:
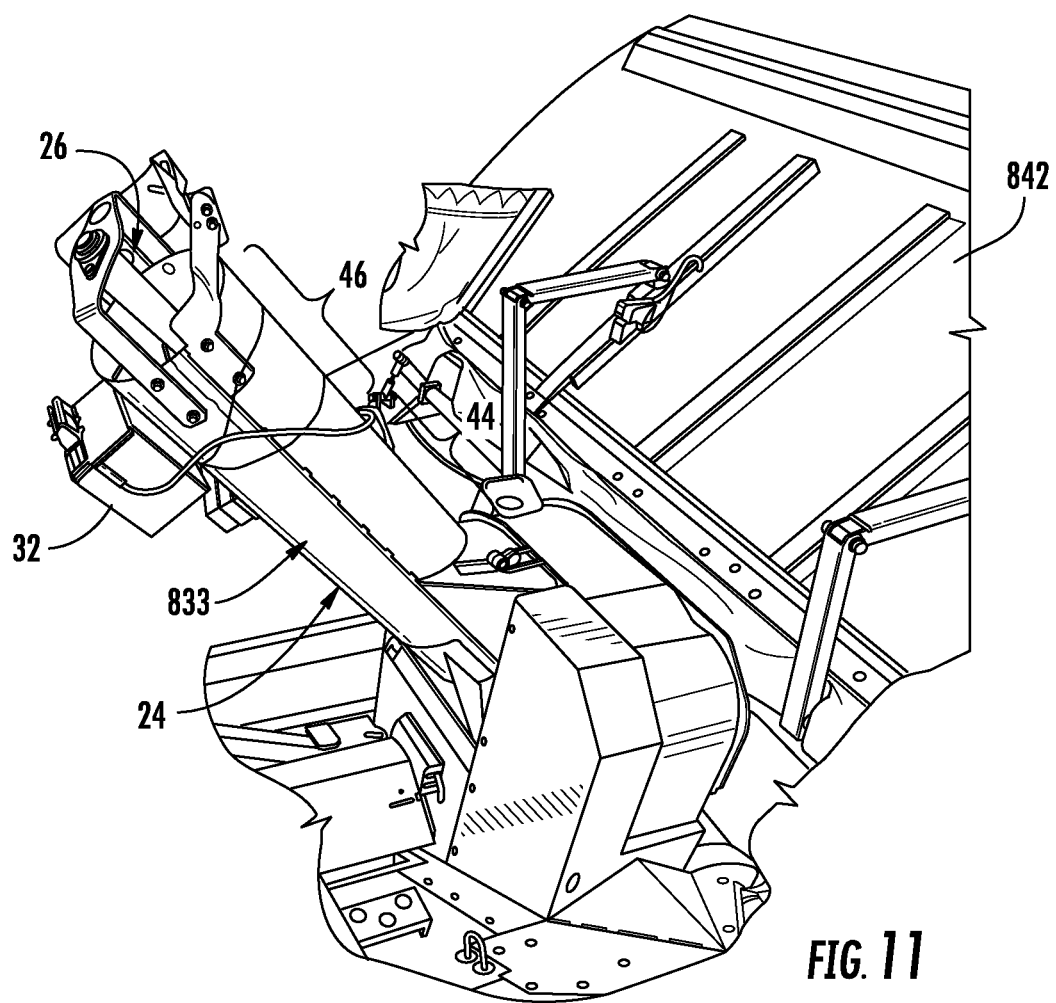
FIG. 11 is a perspective view of an example grain tank and yield estimation system of the combine harvester FIG. 10.

FIG. 11 is a top perspective view of grain tank 842 and clean grain elevator 833 formed from 224 and auger 26. As shown by FIG. 11, combine 800 additionally comprises camera 32 adjacent to region 46 which is vertically above and downstream from portion 44. As noted above, portion 44 comprises auger flights while portion 46 omits auger flights.

Figure 12:
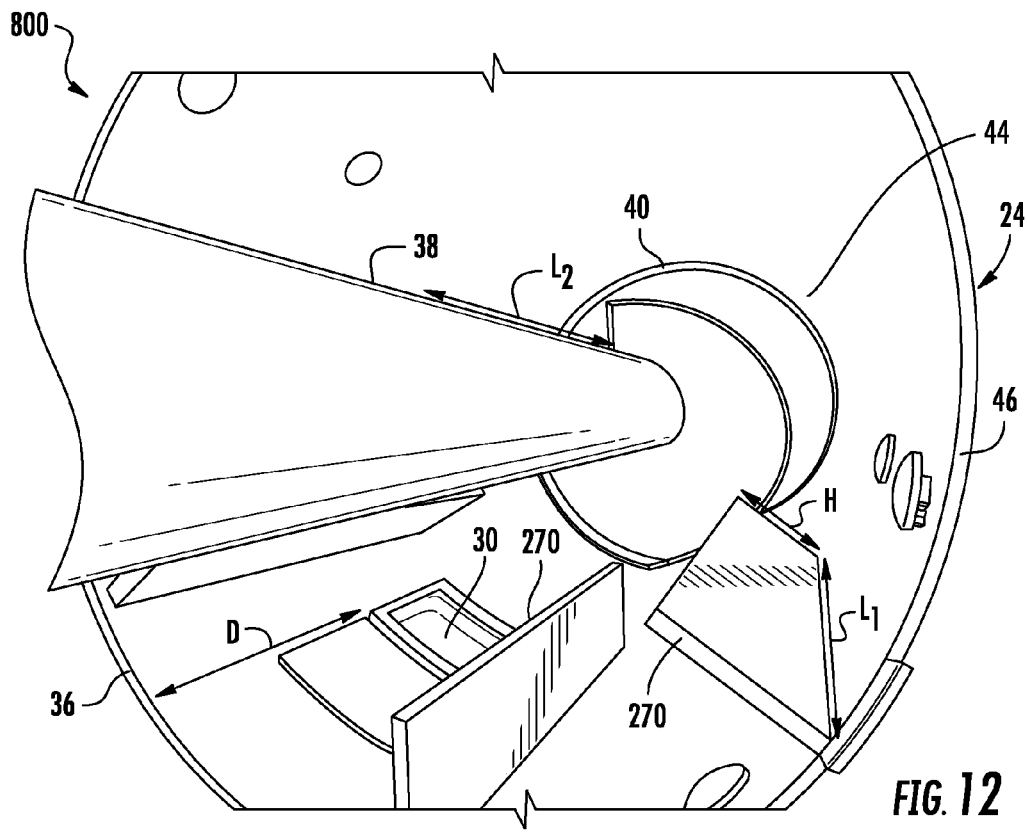
FIG. 12 is a perspective view of an interior of an example grain elevator for the combine harvester of FIG. 11.

FIG. 12 is a perspective view illustrating the interior of an example grain elevator 833 for combine 800. FIG. 12 illustrates portions 44 and 46 of the example tube 24. FIG. 12 illustrates example helical flights 40 as well as baffles 270 extending about window 30. In the example illustrated, harvester combine 800 comprises two baffles 270 on each side of window 30 as shown. In the example illustrated, each of baffles 270 has a length L1 of approximately 9 inches and a height H of approximately 2 inches. Section 46 has a length L2 of approximately 10 inches. Camera window 30 is spaced from the discharge opening 36 by a distance D of approximately 5.25 inches. In other implementations, such structures may have other dimensions and relative locations.

Figure 13:
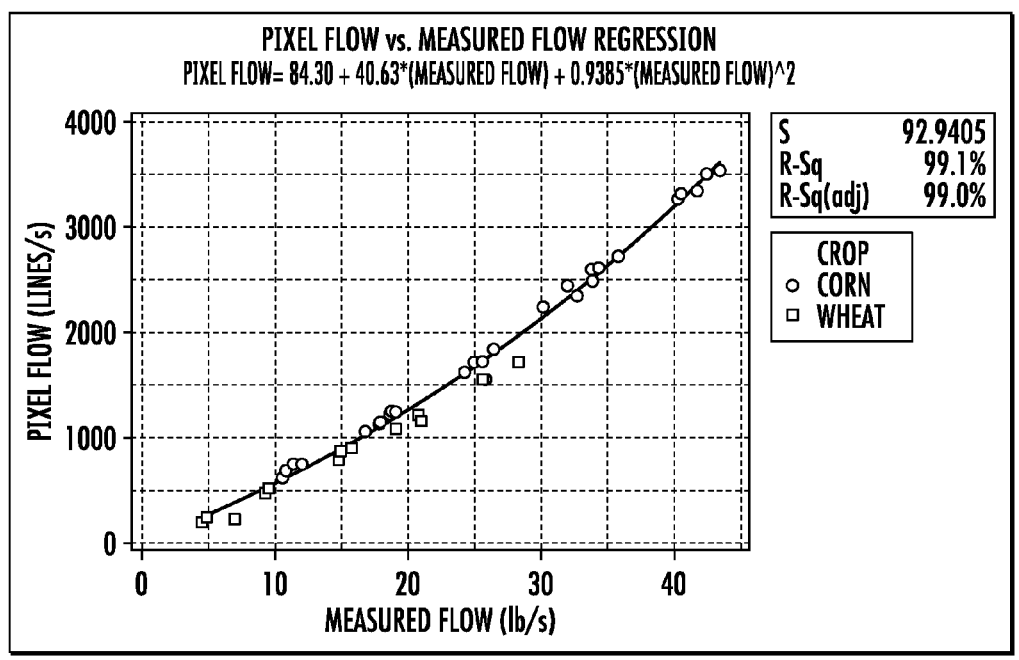
FIG. 13 is a graph illustrating one example correlation between grain pixel flow in lines per second and estimated grain mass flow in pounds per second.

FIG. 13 is a graph illustrating one example of how tracked movement of grain pixels, obtained from images from camera 32, is used to determine the mass flow rate for grain. As described above, the mass flow rate for grain is determined based upon grain movement within portion 46, a dimension a portion 46 and a density of grain within portion 46. In addition, some implementations, adjustments are made in response to a detected partial fill state and/or detected grain retraction a relaxation due to pulsing of the auger. FIG. 13 illustrates the determination of a measured flow of grain, in pounds per second, based upon a varying movement of grain as detected by the movement of grain pixels are therefore in lines per second. FIG. 13 illustrates the correlation between pixel flow and measured grain flow for both corn and wheat for a given tube cross-sectional area and for grain having a given density. As will be appreciated, the exact correlation between pixel flow and measure grain flow may vary depending upon the cross-sectional area of portion 46 and the density of the grain within portion 46. In some implementations, computing device 34 applies a similar correlation formula to convert pixel flow grain flow. In other implementations, computing device 34 consults a lookup table which is based upon such correlations.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A harvester comprising:
   an auger tube having a first portion and a second portion adjacent the first portion;
   an auger flight within the first portion of the tube and terminating prior to the second portion to move grain to the second portion;
   a window along the second portion of the tube;
   a camera to capture images of grain within the second portion of the tube; and
   a computing device to determine grain mass flow rate based upon the captured images, a dimension of the second portion of the tube and a grain density factor.

2. The harvester of claim 1 further comprising a baffle radially projecting along an interior of the second portion of the tube.

3. The harvester of claim 1, wherein the second portion is adjacent a discharge outlet of the auger tube.

4. The harvester of claim 1, wherein the auger tube comprises a third portion adjacent the second portion opposite the first portion and wherein the harvester further comprises a second auger flight within and along the third portion and terminating prior to the second portion.

5. The harvester of claim 1, wherein the computing device is to detect grain relaxation within the second portion due to auger pulsing and wherein the determine grain mass flow rate is additionally based on the detected grain relaxation.

6. The harvester of claim 1, wherein the computing device is to determine a partial fill state of the second portion of the auger tube and wherein the determination of grain mass flow is additionally based on the determined partial fill state.

7. The harvester of claim 6, wherein the determination of the partial fill state is based on the captured images.

8. The harvester of claim 6, wherein the determination of the partial fill state is based upon a sensor of the harvester remote from the second portion of the auger tube.

9. The harvester of claim 8, wherein the sensor comprises one or more sensors selected from a group of sensors consisting of: a crop engagement sensor; a threshing cylinder auger drive sensor; and a clean grain handling system power sensor.

10. The harvester of claim 1, wherein the computing device is to detect a grain type based on the captured images and wherein the grain mass flow rate is determined based on the determined grain type.

11. The harvester of claim 1, wherein the auger tube is inclined.

12. The harvester of claim 1, wherein the second portion has a length of at least 6 inches.

13. A non-transitory computer-readable medium comprising instructions to direct a processor to:
  receive images of grain movement in a portion of an auger tube omitting auger flights;
  detect grain relaxation within the portion due to grain pulsing by the auger flights;
  determine a grain mass flow rate based on the received images of grain movement, a dimension of the portion, a grain density within the portion and the detected grain relaxation; and
  providing an output based on the determined grain mass flow rate.

14. The non-transitory computer-readable medium of claim 13, wherein the instructions are configured to direct the processor to determine a partial fill state of the second portion of the auger tube and wherein the determination of grain mass flow is additionally based on the determined partial fill state.

15. The non-transitory computer-readable medium of claim 14, wherein the determination of the partial fill state is based on the captured images.

16. The non-transitory computer-readable medium of claim 14, wherein the determination of the partial fill state is based upon a sensor of the harvester remote from the second portion of the auger tube.

17. The non-transitory computer-readable medium of claim 16, wherein the sensor comprises one or more sensors selected from a group of sensors consisting of: a crop engagement sensor; a threshing cylinder auger drive sensor; and a clean grain handling system power sensor.

18. The non-transitory computer-readable medium of claim 13, wherein the instructions are configured to direct the processor to detect a grain type based on the captured images and wherein the grain mass flow is determined based on the determined grain type.

19. A method comprising:
  receiving images of grain movement in a portion of an auger tube omitting auger flights;
  detecting and identifying a partial fill state of the portion of the auger tube; and
  determining a grain mass flow based on the images of grain movement, a dimension of the portion, a grain density within the portion and the detected partial fill state, wherein the grain mass flow is determined in a first manner in response to a detected an identified partial fill state and in a second manner, different than the first manner, in response to absence of the partial fill state.

20. The method of claim 19, wherein the instructions are configured to further direct the processor to detect grain relaxation within the portion due to grain pulsing, wherein the determine grain mass flow is additionally based upon the detected grain relaxation.

21. The method of claim 19, wherein the determination of the grain mass flow additionally comprises subtracting a portion of the grain mass flow in response to the identification of the partial fill state.

22. The method of claim 19 comprising determining a yield estimate based upon the mass flow rate, wherein a portion of the yield estimate is subtracted for a portion of the monitoring time determined to be in a partial fill state.

23. The method of claim 19, wherein the determination of the grain mass flow excludes any detected grain movement for those periods of time identified as being in a partial fill state.

* * * * *